Figure 1:
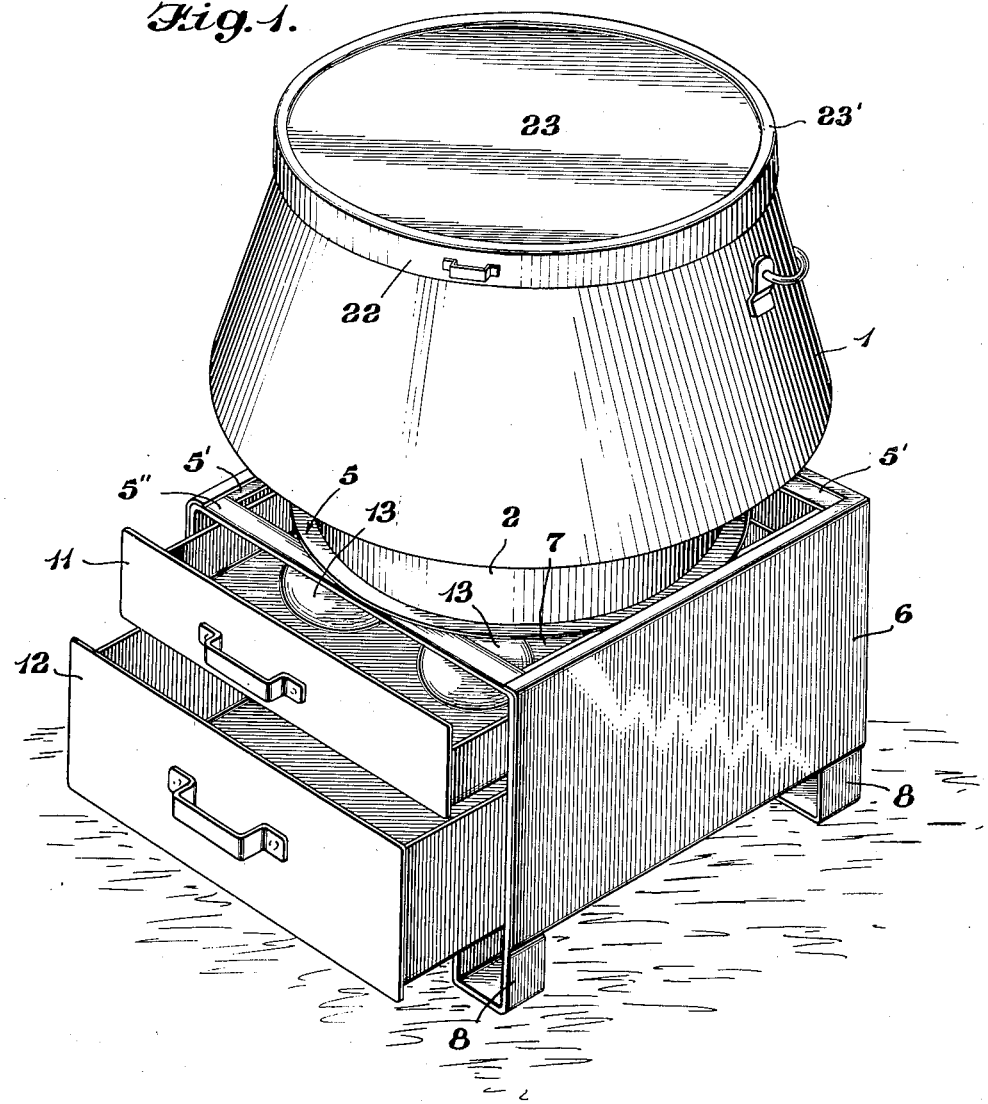

April 1, 1941.  W. W. OWENS  2,237,081
COOKER AND HEATER
Filed June 9, 1939  2 Sheets-Sheet 1

Inventor
W. W. Owens,
By
Attorneys

April 1, 1941. W. W. OWENS 2,237,081
COOKER AND HEATER
Filed June 9, 1939 2 Sheets-Sheet 2

Inventor
W. W. Owens,

Attorneys.

Patented Apr. 1, 1941

2,237,081

UNITED STATES PATENT OFFICE 2,237,081

COOKER AND HEATER

Walter W. Owens, Hollywood, Calif., assignor to Owens Smokeless Orchard Heater, Incorporated, Hollywood, Calif., a corporation of California Application June 9, 1939, Serial No. 278,344

14 Claims. (Cl. 126—25)

This invention relates to cookers and heaters, more particularly of the type used by sportsmen, campers, and the like, although not so limited.

The primary object of the invention is to provide a stove of this type which combines the factors of absolute safety; ready portability; susceptibility of use with all characters of fuel; minimum space in transportation; rugged in construction to withstand rough usage; and one affording a maximum of heat both in cooking and heating.

Further, the invention aims to provide a stove of this type which is unaffected in operation by wind or other encountered elements.

The invention has still further and other objects, which will be later herein set forth, and of themselves manifested in the course of the following description.

Figure 3:
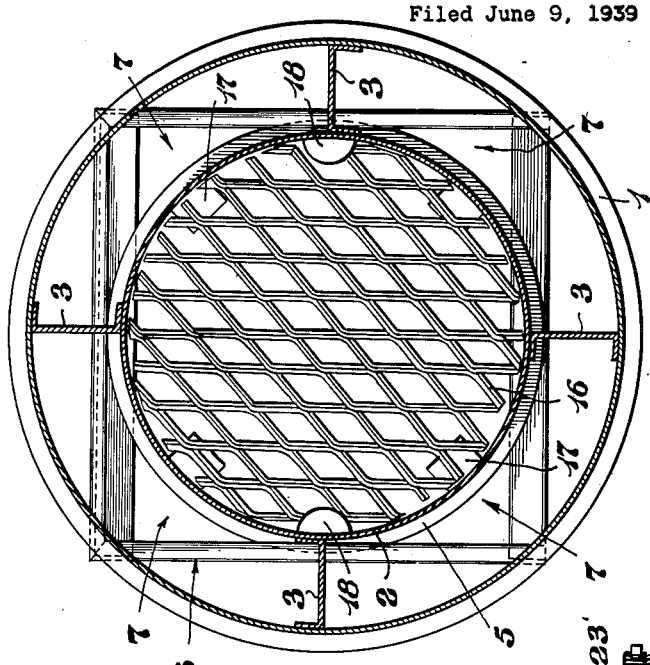
Figure 4:
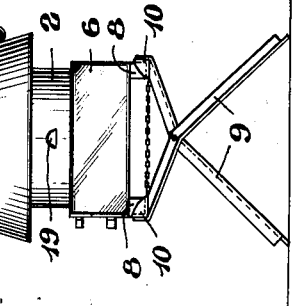
Figure 2:
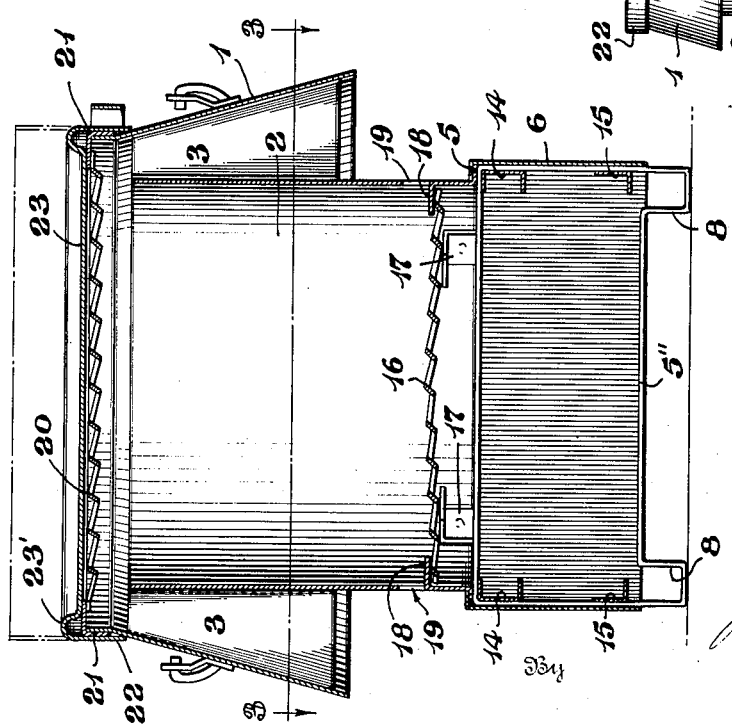

In the drawings:

Fig. 1 is a perspective view of the invention, the ash and oven drawers shown partly open, Fig. 2 is a central vertical section of Fig. 1, the drawers being removed, Fig. 3 is a section on line 3—3 of Fig. 2, and Fig. 4 is a side elevation, showing the stove mounted on a foldable support.

In accordance with the present invention, I adhere to the principle of that disclosed in my co-pending application, Serial No. 151,265, filed June 30, 1937, now Patent No. 2,186,173, January 9, 1940, of which this application is a continuation in part.

Therefore, the frusto-conical shell 1, has a generally cylindrical fire pot 2, secured therewithin, by means of angle plates 3, so as to provide space between the confronting side walls of the shell and pot. The plates 3, additionally divide the space into a series of vertical flues.

As in my said application, the fire pot has an open top and bottom, the latter having its bottom projecting below that of the shell, and supported above the surface of the ground, while the top of the shell is closed by means of a removable cover 23, more specifically hereinafter referred to.

In the present invention, the bottom of the fire pot is outwardly flanged at 5, and is rigidly secured, in any appropriate manner, to the open top portion of a substantially rectangular base, or casing 6, clearly depicted in Fig. 1, so as to provide a plurality of air inlets 7, here shown as four in number, at the bottom of the fire pot. Thus, the flange 5 may be secured to and between inwardly extending flanges 5' at the rear and sides of the casing 6, and to the top of a bracing or strengthening member 5", which latter connects the sides, top, and bottom of the casing at the front of the latter.

The casing is preferably provided with four feet 8, integral with member 5" which when the stove is used without a rack, or support, such as the foldable one 9, depicted in Fig. 4, seat directly on the ground. The foldable rack or support, preferably used, is generally similar to the familiar camp stool, chains 10 being used to restrict opening movement of the support, in lieu of the omitted seat of the usual stool. The upper portions of the rack are provided with seats 16, to receive the feet 8 of the stove. Obviously, the foldable support or rack is an optional convenience in order to more easily perform cooking operations on the ground, but is also used, where the stove is supported on the wooden floor of a tent, or on the bottom of a boat.

The casing 6, of generally U-form, has an open top, bottom, and front, the latter to provide for the opening and closing movements of an upper ash drawer 11, and a lower oven drawer 12. The member 5", above referred to, also functions to hold the sides of the casing 6 against any spreading tendency, at its front. The bottom of the ash drawer is formed with spaced bulged or dome-like portions 13, of concavo-convex cross section, which function in a dual manner, namely: to strengthen the bottom against heat warpage, and to also act to deflect and spread the ashes, thus causing more uniform laying thereof over the bottom, upon impact of the gravitating ashes with the dome-like portions 13. The drawers are mounted to slide on guides 14 and 15, secured to the side walls of the casing, Fig. 2.

A preferably slightly crowned foraminated, or mesh grate 16, is supported within the bottom portion of the fire pot, by means of angle brackets 17, and is removably held in position, by means of ears 18, struck-out from the sides of the fire pot 2, and which engage the upper face of the grate. The openings 19, resultant from the striking out of ears 18, also afford additional air supply inlets, as is deemed apparent.

The top of the shell 1, is provided with a grille 20, affixed to a flanged ring 21, which removably telescopes over the top of the shell, and over which in turn is telescoped the flange 22 of a likewise removable cover 23. The flange also extends upwardly to form a rim 23' for the griddle. The cover 23, in the position shown in the drawings is useable as a griddle, in the cooking of flapjacks, eggs, bacon, etc., and by virtue of its flange 22, and upon reversal, as shown in dotted lines, is useable as a frying pan, in frying potatoes, chicken, etc. As shown, the various removable elements are equipped with the customary handles, for convenience in use.

The device, when used as a cooker, or heater, may be placed directly on the ground, with the feet 8 resting thereon. When so used, the drawers 11 and 12 may be removed, so that free space is afforded to supply air to and beneath the fire pot, the heated air rising, and striking the top, being then deflected downwardly in the space between the confronting side walls of the shell 1 and fire pot 2, and thence flows outwardly and toward the ground. The aforesaid downward travel of the heated air, results in the base 6 being enveloped thereby, thus affording heat for baking. The removal of the drawers assures maximum air supply, with resultant increased heat when the stove is used solely for heating, or as an orchard heater.

As a heater, and due to its readily portable nature, the stove is susceptible of a wide range of uses, including farm buildings, especially in exceptionally cold weather, where preservation of the stock otherwise might be attended with danger.

Consequently, the uses of the stove herein set forth, are to be considered as but examples, and not exhaustive enumeration of all uses.

Charcoal is regarded as the ideal fuel, owing to its light weight, but other fuels can be used as are available only in any particular locality.

Likewise, the invention is also susceptible to changes in construction, such as fall within the scope and spirit of the following claims.

What is claimed is:

1. A cooker and heater, including a substantially rectangular base having an open top, a fire pot secured adjacent its bottom to the open upper portion of the base so as to provide air inlets for the fire pot at the corners of the base, a shell surrounding the fire pot in spaced relation thereto, means to connect the pot to the shell, and a top for the shell, the fire pot having open ends with the upper end terminating spaced below said top of the shell.

2. A cooker and heater, in accordance with claim 1, wherein the base has an open front, and wherein there are superposed ash and baking drawers slidably mounted within the base and removable through the open front of the base.

3. In a cooker and heater, a base, an ash drawer and an underlying baking drawer carried by the base, in superposed relation, a fire pot above the ash drawer having an open top, a shell surrounding the fire pot in spaced relation thereto, means to connect the pot to the shell, a cover for the shell disposed above the open top of the fire pot, whereby to direct heat from the latter downwardly against the base, and a grille carried by the upper end of the shell, said cover being removable whereby to expose the grille for cooking.

4. In a cooker, a fire pot having an open top, a grille, means to support the grille over the pot top, and a griddle removably carried by the grille and having a flange which extends upwardly to form a rim for the griddle and which also extends downwardly and removably engages a grille whereby upon reversal to provide a frying pan.

5. In a stove of the character described, a fire pot having open ends, a shell surrounding the pot in spaced relation thereto and having an open lower end and a closed top, and means to connect the pot to the shell and to divide the space into a series of flues, composed of vertical angle plates having their sides connected to the confronting sides of the pot and shell.

6. A stove including a base having an open top, a fire pot having open ends and having its bottom connected to the top of the base, a shell surrounding the fire pot in spaced relation thereto, and having its upper end extending above the upper end of the fire pot, means to connect the pot to the shell, a top for the shell, and means to hold the base spaced above a supporting surface, said base and fire pot having adjacent walls of varying marginal configurations whereby to provide inlets between such walls for supplying air to the fire pot, the spacing of the fire pot and shell providing for downward movement of the heated air issuing from the fire pot.

7. A stove including a base having a baking chamber, a fire pot having open ends and having its bottom secured to the top of the base, a shell surrounding the fire pot and having its upper end extending above the upper end of the fire pot, and its lower end spaced above the surface on which the stove is supported, a top for the shell, and means to connect the pot to the shell, there being air inlets in the base to provide for the entry of air into the fire pot, the fire pot and shell being spaced whereby the heated air from the fire pot is directed downwardly by the top of the shell in the space between the shell and fire pot and against the baking chamber, and against the surface on which the stove is supported.

8. A stove in accordance with claim 7, wherein the baking chamber consists of a removable drawer, and wherein the bottom of the base is open, whereby upon removal of the baking drawer to also allow air to enter the fire pot, from below the base.

9. A stove including a base, a fire pot having open ends and having its bottom secured to the top of the base, a shell surrounding the fire pot in spaced relation thereto and having its upper end extending above the upper end of the fire pot, a top for the shell, means to connect the pot to the shell, means to provide for the entry of air into the bottom of the fire pot, a baking chamber carried by the base and located below the fire pot, and means to hold the base above a supporting surface to provide space between the latter and the base, whereby heated air directed downwardly by the top of the shell will flow in the space between the latter and the fire pot, over the sides of the base and in the space between the supporting surface and the bottom of the baking chamber.

10. A stove in accordance with claim 9, wherein the fire pot has side walls spaced in part, from the adjacent side walls of the base to provide said air entry means for the fire pot.

11. A stove including a base having a top, a fire pot having open ends and having its bottom connected to the top of the base, a shell surrounding the fire pot in spaced relation thereto and having its upper end extending above the upper end of the fire pot and having its lower end spaced above the top of the base; means to connect the pot to the shell, a top for the shell, means to hold the base spaced above a supporting surface, the top of the base having air inlets for admitting air to the fire pot, and a baking drawer below the fire pot, the baking drawer being removable whereby upon removal to allow air to enter the fire pot from below the bottom of the base.

12. A stove including a base having an open top and side walls, the upper portions of which side walls are of polygonal outline, a fire pot secured at the bottom portion thereof to the base, and having side walls which at their bottom are of a configuration different from that of, and spaced from the upper portions of those of the base, whereby to provide air inlets for the fire pot between the adjacent side walls of the fire pot and the base, a shell surrounding the fire pot in spaced relation thereto, and having a closed upper end located spaced above the upper end of the fire pot, and means to connect the pot to the shell.

13. In a cooker, a base having a baking compartment, a fire pot carried by the base, and having an open top, a shell surrounding the fire pot in spaced relation thereto, means to connect the pot to the shell, a cover for the shell disposed above the open top of the fire pot whereby to direct heat from the latter downwardly against the baking compartment of the base, and a grille carried by the upper end of the shell beneath the cover of the latter, which cover is removable to expose the grille for cooking.

14. In a cooker, a base having a baking compartment, a fire pot carried by the upper portion of the base, and having an open top, a shell surrounding the fire pot in spaced relation thereto and having its lower portion terminating above the surface on which the base is supported, means to connect the pot to the shell, and a cover for the shell disposed above the open top of the fire pot whereby to direct heat from the latter downwardly against the baking compartment of the base.

WALTER W. OWENS.